(12) United States Patent
Amagasa

(10) Patent No.: US 9,184,689 B2
(45) Date of Patent: Nov. 10, 2015

(54) MOTOR CONTROL DEVICE

(75) Inventor: Toshiyuki Amagasa, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 14/129,247

(22) PCT Filed: Jun. 22, 2012

(86) PCT No.: PCT/JP2012/066081
§ 371 (c)(1),
(2), (4) Date: Dec. 24, 2013

(87) PCT Pub. No.: WO2013/005591
PCT Pub. Date: Jan. 10, 2013

(65) Prior Publication Data
US 2014/0125255 A1 May 8, 2014

(30) Foreign Application Priority Data
Jul. 6, 2011 (JP) .................................. 2011-150108

(51) Int. Cl.
H02P 3/06 (2006.01)
H02P 23/00 (2006.01)

(52) U.S. Cl.
CPC ................................. *H02P 23/0063* (2013.01)

(58) Field of Classification Search
CPC ....................................................... H02P 3/06
USPC ................................................ 318/3, 119, 34
See application file for complete search history.

(56) References Cited

U.S. PATENT DOCUMENTS

| 4,866,357 | A | * | 9/1989 | Miller et al. | .................. 318/443 |
| 5,225,752 | A | | 7/1993 | Yasuda et al. | |
| 6,281,649 | B1 | * | 8/2001 | Ouellette et al. | .............. 318/443 |
| 6,703,804 | B1 | | 3/2004 | Courdier et al. | |
| 6,917,173 | B2 | * | 7/2005 | Takagi | .......................... 318/444 |
| 8,405,336 | B2 | * | 3/2013 | Natsume | ....................... 318/444 |

FOREIGN PATENT DOCUMENTS

| CN | 1387485 A | 12/2002 |
| CN | 101992746 A | 3/2011 |
| DE | 102008001816 A1 | 11/2009 |

(Continued)

OTHER PUBLICATIONS

Japanese Office Action dated Nov. 25, 2014, issued in JP 2011-150109.

(Continued)

Primary Examiner — David S Luo
(74) Attorney, Agent, or Firm — Kenyon & Kenyon LLP

(57) ABSTRACT

A motor control device which controls rotation of a motor to which an object to be controlled is connected through a link mechanism, the motor control device comprising: a parameter input means configured to input information about operation start and end positions of the object to be controlled and parameters necessary for controlling the motor including at least rotation speed information of the motor; a position detection means configured to detect a position of the object to be controlled; and a driving control means configured to calculate a deceleration start position from the information about the operation start and end positions to drive the motor, and to perform a subtraction operation on the target rotation speed when it is detected that the object to be controlled has reached the deceleration start position to drive the motor.

3 Claims, 12 Drawing Sheets

(56) References Cited

FOREIGN PATENT DOCUMENTS

| | | |
|---|---|---|
| EP | 1449728 A2 | 8/2004 |
| FR | 2785246 A1 | 5/2000 |
| JP | 02-099447 | 4/1990 |
| JP | 2009012581 A | 1/2009 |
| JP | 2009-067275 | 4/2009 |
| JP | 2009-248650 | 10/2009 |
| JP | 2010-173338 | 8/2010 |
| JP | 2010-179910 | 8/2010 |
| WO | 2008049536 A1 | 5/2008 |

OTHER PUBLICATIONS

International Search Report for PCT/JP2012/066081 mailed Sep. 11, 2012.

Chinese Office Action issued in corresponding Chinese Patent Application No. 201280031412.0, dated Apr. 15, 2015.

European Supplementary Search Report issued in corresponding European Patent Application No. 12807278.2, dated Aug. 28, 2015.

\* cited by examiner

FIG. 2

| INPUT SIGNAL PATTERN | CONTROL PARAMETER | |
|---|---|---|
| WIPER SWITCH SIGNAL – Lo<br>BONNET OPEN/CLOSE SIGNAL – CLOSE<br>VEHICLE SPEED SIGNAL – ~60 Km/h | MAXIMUM ROTATION SPEED | 65 |
| | OPERATION START POSITION | 0 |
| | OPERATION END POSITION | 150 |
| | ADDITION AMOUNT | 1/X1 |
| | SUBTRACTION AMOUNT | 1/(X2−1) |
| ⋮ | ⋮ | |
| ⋮ | ⋮ | |

FIG. 6

| [deg] | 0.0 | 1.0 | 2.5 | 4.5 | 7.0 | 10.0 | 13.5 | 17.5 | 22.0 | 27.0 | 32.5 | 38.5 | 45.5 | 53.5 | 62.0 | 72.5 |
|---|---|---|---|---|---|---|---|---|---|---|---|---|---|---|---|---|
| [rpm] | 7.7 | 16.9 | 25.7 | 33.0 | 39.4 | 44.8 | 49.6 | 53.5 | 56.8 | 59.5 | 61.5 | 63.0 | 64.0 | 64.6 | 65.0 | 65.1 |

| [deg] | 82.0 | 91.0 | 99.5 | 107.5 | 114.5 | 120.5 | 126.0 | 131.0 | 135.5 | 139.5 | 143.0 | 146.0 | 148.5 | 150.5 | 152.0 |
|---|---|---|---|---|---|---|---|---|---|---|---|---|---|---|---|
| [rpm] | 65.1 | 65.0 | 64.6 | 64.1 | 63.0 | 61.6 | 59.6 | 57.0 | 53.8 | 49.9 | 45.3 | 39.8 | 33.6 | 26.3 | 17.7 |

FIG. 8

| INPUT SIGNAL PATTERN | CONTROL PARAMETER | |
|---|---|---|
| WIPER SWITCH SIGNAL – Lo<br>BONNET OPEN/CLOSE SIGNAL – CLOSE<br>VEHICLE SPEED SIGNAL – ~60 Km/h | MAXIMUM ROTATION SPEED | 65 |
| | OPERATION START POSITION | 0 |
| | OPERATION END POSITION | 150 |
| | ADDITION AMOUNT | 1/X1 |
| | SUBTRACTION AMOUNT | 1/(X2−1) |
| ⋮ | ⋮ | |
| ⋮ | ⋮ | |

MOTOR CONTROL DEVICE

TECHNICAL FIELD

The present invention relates to a motor control device which controls rotation of a motor that operates a wiper device and the like provided in a vehicle.

Priority is claimed on Japanese Patent Application No. 2011-150108, filed Jul. 6, 2011, the content of which is incorporated herein by reference.

BACKGROUND ART

On a vehicle, a wiper device is provided to wipe off rain, splashes from a preceding vehicle, etc. attached to a windshield and to secure a driver's view. The wiper device has a wiper arm whose oscillation is controlled by a wiper-driving device and a wiper blade abutting the windshield is mounted on a tip end of the wiper arm. The wiper arm on which the wiper blade is mounted performs a reciprocating motion, so that wiping of the windshield is performed. A link mechanism changes a rotational motion of a motor to a reciprocating motion and thus the wiper arm performs a wiping operation.

In such a wiper device, a wiper control device which controls overrun of the blade during inversion while suppressing variation in a wiping cycle (for example, see Patent Literature 1) is known. The wiper control device acquires an elapsed time and the target number of rotations of the motor, determines a current state of the blade by calculating a current position of the blade and the current number of rotations of the motor, and appropriately corrects the number of rotations of the motor based on the determined current state. First, a correction value of the number of rotations of the motor is calculated. Subsequently, a correction addition upper limit value is calculated by setting the correction target number of rotations from the correction value and the target number of rotations. Next, the upper limit number of rotations is calculated by adding the correction addition upper limit value to the target number of rotations. Then, an increase in the number of rotations of the motor is suppressed by setting the upper limit number of rotations as the ultimate target number of rotations from a result of comparison between the upper limit number of rotations and the correction target number of rotations. Thereby, a blade speed can be suppressed during inversion.

CITATION LIST

Patent Literature

[Patent Literature 1]
Japanese Unexamined Patent Application, First Publication No. 2010-173338

SUMMARY OF INVENTION

Problem to be Solved by the Invention

Incidentally, the wiper device of the related art is equipped with a microcomputer and speed control is performed to follow a target value. In this wiper device, the target value is controlled by arranging relations of a "target speed at each angle," a "target angle at each elapsed time," and a "target speed at each elapsed time," etc. at fixed or arbitrary intervals, directly using its value, and performing interpolation. FIG. 6 is a diagram illustrating a table structure of a table in which the target number of rotations (a target rotation speed) of the motor is associated for each angle of the wiper arm. A control device of the wiper device can implement a smooth wiping operation by referring to the table illustrated in FIG. 6 and controlling the number of rotations of the motor for each angle of the wiper arm.

However, when the control resolution is increased and a plurality of pieces of vehicle model data are provided in the wiper device having the table in which the target number of rotations of the motor is associated for each angle of the wiper arm illustrated in FIG. 6, a large memory capacity is necessary to store data of the target number of rotation speeds. In this case, there is a problem in that the cost of the wiper device increases because an expensive microcomputer having a large memory capacity should be used. In addition, in a table in which angles are associated with the target number of rotations illustrated in FIG. 6, the angles of a wiping range of the wiper arm are defined to perform a normal wiping operation. Then, when the wiping range is varied or when the wiping speed is varied, a number of tables according to an operation of the wiper arm should be provided. Thus, it is necessary to perform a special process in a control-processing operation in order to perform a special operation rather than the normal wiping operation. As a result, there is also a problem in that the control device is complex and the cost of the control device increases.

The present invention has been made in view of such circumstances, and an object of the invention is to provide a motor control device capable of controlling rotation of a motor with a small memory capacity.

Solution to Problem

According to the present invention, a motor control device is provided which controls rotation of a motor to which an object to be controlled is connected through a link mechanism, the motor control device including: a parameter input means configured to input information about operation start and end positions of the object to be controlled and parameters necessary for controlling the motor including at least rotation speed information of the motor; a position detection means configured to detect a position of the object to be controlled; and a driving control means configured to calculate a deceleration start position from the information about the operation start and end positions to drive the motor while accelerating the motor so that the motor rotates at a target rotation speed until the position detection means detects that the object to be controlled has reached the deceleration start position when the object to be controlled is operated from the operation start position to the operation end position, and performs a subtraction operation on the target rotation speed at a point in time at which it is detected that the object to be controlled has reached the deceleration start position to drive the motor while decelerating the motor so that the motor rotates at the target rotation speed until the position detection means detects that the object to be controlled has reached the operation end position.

According to the present invention, a motor control device is provided which controls rotation of a motor to which an object to be controlled is connected through a link mechanism, the motor control device including: a parameter input means configured to input parameters necessary for controlling the motor including information about operation start and end positions of the object to be controlled, information about a maximum rotation speed of the motor, addition amount information of a rotation speed, and subtraction amount information of the rotation speed; a position detection means configured to detect a position of the object to be controlled; and a driving control means configured to calculate a deceleration start position from the information about the operation start and end positions, perform an addition operation on a target rotation speed based on a difference between the maximum rotation speed and the rotation speed at a current time point and the addition amount information when the object to be controlled is operated from the operation start position to the operation end position to drive the motor while accelerating the motor so that the motor rotates at the target rotation speed until the position detection means detects that the object to be controlled has reached the deceleration start position, and perform a subtraction operation on the target rotation speed based on the difference between the maximum rotation speed and the rotation speed at the current time point and the subtraction amount information at a point in time at which it is detected that the object to be controlled has reached the deceleration start position to drive the motor while decelerating the motor so that the motor rotates at the target rotation speed until the position detection means detects that the object to be controlled has reached the operation end position.

According to the present invention, a motor control device is provided which controls rotation of a motor to which an object to be controlled is connected through a link mechanism, the motor control device including: a signal input means configured to input a signal from an outside; a parameter storage means in which parameters necessary for controlling the motor including an input signal pattern input by the signal input means, information about operation start and end positions of the object to be controlled, information about a maximum rotation speed of the motor, addition amount information of a rotation speed, and subtraction amount information of the rotation speed are associated and stored in advance; a position detection means configured to detect a position of the object to be controlled; and a driving control means configured to read the parameters necessary for controlling the motor associated with the input signal pattern input by the signal input means from the parameter storage means, calculate a deceleration start position from the information about the operation start and end positions, perform an addition operation on a target rotation speed based on a difference between the maximum rotation speed and the rotation speed at a current time point and the addition amount information when the object to be controlled is operated from the operation start position to the operation end position to drive the motor while accelerating the motor so that the motor rotates at the target rotation speed until the position detection means detects that the object to be controlled has reached the deceleration start position, and perform a subtraction operation on the target rotation speed based on the difference between the maximum rotation speed and the rotation speed at the current time point and the subtraction amount information at a point in time at which it is detected that the object to be controlled has reached the deceleration start position to drive the motor while decelerating the motor so that the motor rotates at the target rotation speed until the position detection means detects that the object to be controlled has reached the operation end position.

According to the present invention, the object to be controlled is a wiper device provided in a vehicle.

Advantageous Effects of Invention

According to the present invention, it is unnecessary to store a target rotation speed for each angle because a target rotation speed is obtained by an arithmetic operation. Thus, there is an advantageous effect in that a microcomputer with a small memory capacity is applicable and an increase in cost of a control device can be prevented. In addition, because rotation of a motor is controlled based on control parameters, it is possible to narrow an operation range or implement an operation in which the target rotation speed is changed without increasing a table in which a relationship between a position of an object to be controlled and the target rotation speed is defined. Further, it is possible to set a smooth target rotation speed because interpolation is not a linear interpolation.

BRIEF DESCRIPTION OF DRAWINGS

FIG. 2 is an explanatory diagram illustrating a table structure of a parameter storage section unit illustrated in FIG. 1.

FIG. 6 is an explanatory diagram illustrating a table structure of a table in which the target number of rotations is associated for each angle of a wiper arm.

FIG. 8 is an explanatory diagram illustrating a table structure of a parameter storage section unit illustrated in FIG. 7.

DESCRIPTION OF EMBODIMENTS

First Embodiment

Figure 1:
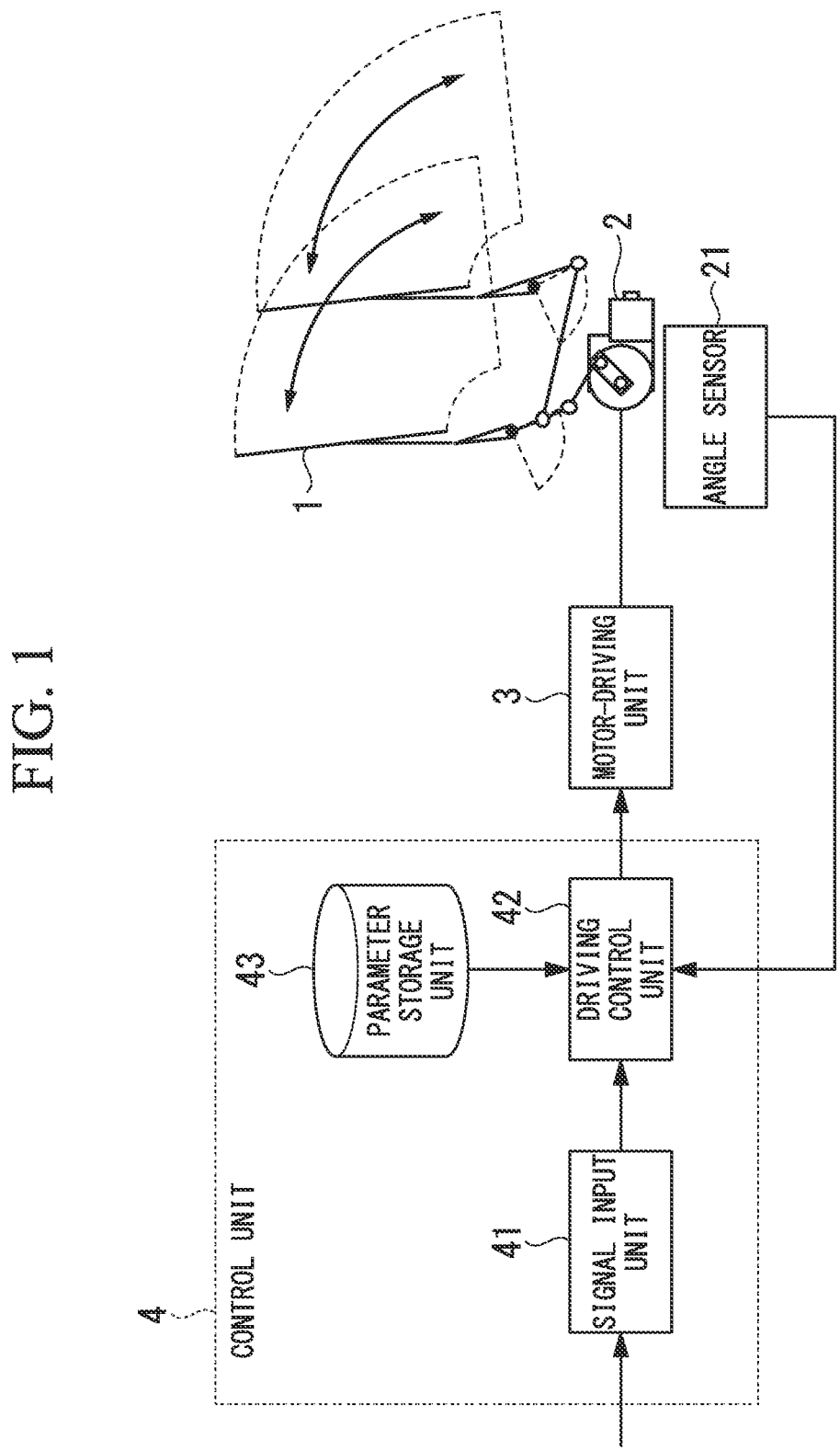
FIG. 1 is a block diagram illustrating a configuration of a first embodiment of the present invention.

Hereinafter, a motor control device according to the first embodiment of the present invention will be described with reference to the drawings. FIG. 1 is a block diagram illustrating a configuration of the present embodiment. Here, an example of a wiper device provided on a vehicle will be described as an object to be controlled according to rotation of a motor which is controlled by the motor control device. In FIG. 1, reference sign 1 denotes a wiper arm which wipes a windshield. Reference sign 2 denotes a motor for causing the wiper arm 1 to perform a wiping operation. The wiper arm 1 is connected to a rotary shaft of the motor 2 through a link mechanism, and performs the wiping operation by switching a rotational direction of the rotary shaft between forward rotation and reverse rotation and reciprocating the wiper arm 1. Reference sign 21 denotes an angle sensor which detects and outputs a rotational angle of the rotary shaft of the motor. Here, for simplicity of description, the rotational angle of the rotary shaft of the motor 2 and the operation angle of the wiper arm 1 will be described as being consistent with each other. That is, the rotary shaft of the motor 2 is assumed to reciprocate at the rotational angle between 0 degrees and 150 degrees if the operation angle of the wiper arm 1 is 0 degrees to 150 degrees. Reference sign 3 denotes a motor-driving unit which drives the motor 2 by controlling power to be supplied according to a driving command.

Reference sign 4 denotes a control unit which outputs the driving command to the motor-driving unit 3 in order to control the rotation of the motor 2, and includes a microcomputer. Reference sign 41 denotes a signal input unit which inputs a signal which is transmitted and received within a vehicle via an in-vehicle local area network (LAN), for example, a controller area network (CAN) or a local interconnect network (LIN). The signal input by the signal input unit 41 includes a signal representing a state of a wiper switch for issuing an instruction for a wiping operation start/stop to the wiper device or a signal representing a speed (a low speed, a high speed, intermittence, or the like) of the wiping operation. In addition, a signal representing a speed of the vehicle or a signal representing an open/close state of a bonnet is also input to the signal input unit 41.

Reference sign 42 denotes a driving control unit which controls the wiping operation of the wiper arm 1 by controlling the operation of the motor 2 based on a signal input in the signal input unit 41. Reference sign 43 denotes a parameter storage unit which associates and stores a pattern of the input signal input in the signal input unit 41 and parameters for controlling the motor 2 in advance.

Next, a table structure of the parameter storage unit 43 illustrated in FIG. 1 will be described with reference to FIG. 2.

FIG. 2 is a diagram illustrating the table structure of the parameter storage unit 43 illustrated in FIG. 1. In the parameter storage unit 43, control parameters are associated and stored for each input signal pattern.

When signals of three systems are input to the signal input unit 41, the input signal pattern is made by classifying the signals of the three systems. When the signal to be input is a wiper switch signal, a bonnet open/close signal, or a vehicle speed signal, classification is performed for each signal value. For example, a first input signal pattern is when a wiper switch is set to "Lo" representing a low-speed wiping operation, a bonnet open/close signal is "close," and a vehicle speed signal is less than or equal to 60 km/h. In this classification, all the cases in which it is necessary to control an operation of the wiper device according to a signal input to the signal input unit 41 are associated and stored in advance.

The control parameters include five parameters such as a "maximum rotation speed", an "operation start position", an "operation end position", an "addition amount", and a "subtraction amount". The "maximum rotation speed" is a maximum value of the rotation speed of the motor 2 when the wiper arm 1 operates from a current position or a predetermined position to a target position. Here, the rotation speed is represented by the number of rotations [rpm]. The "operation start position" is a position of the wiper arm 1 at a point in time at which a predetermined operation is started. Here, it is assumed that the position of the wiper arm 1 is represented by an angle, a storage position of the wiper arm 1 is 0 degrees, and a return position of the wiper arm 1 is 150 degrees in a maximum wiping range.

The "operation end position" is a position of the wiper arm 1 when a predetermined operation is ended. For example, when the wiper arm is caused to perform a wiping operation in a maximum wiping range, the "operation start position" is 0 degrees and the "operation end position" is 150 degrees. The "addition amount" is a value for adding a rotation speed amount for each control cycle when the wiper arm 1 is accelerated up to the maximum rotation speed. The "subtraction amount" is a value for subtracting a rotation speed amount for each control cycle when the wiper arm 1 is decelerated from the maximum rotation speed.

Figure 3:
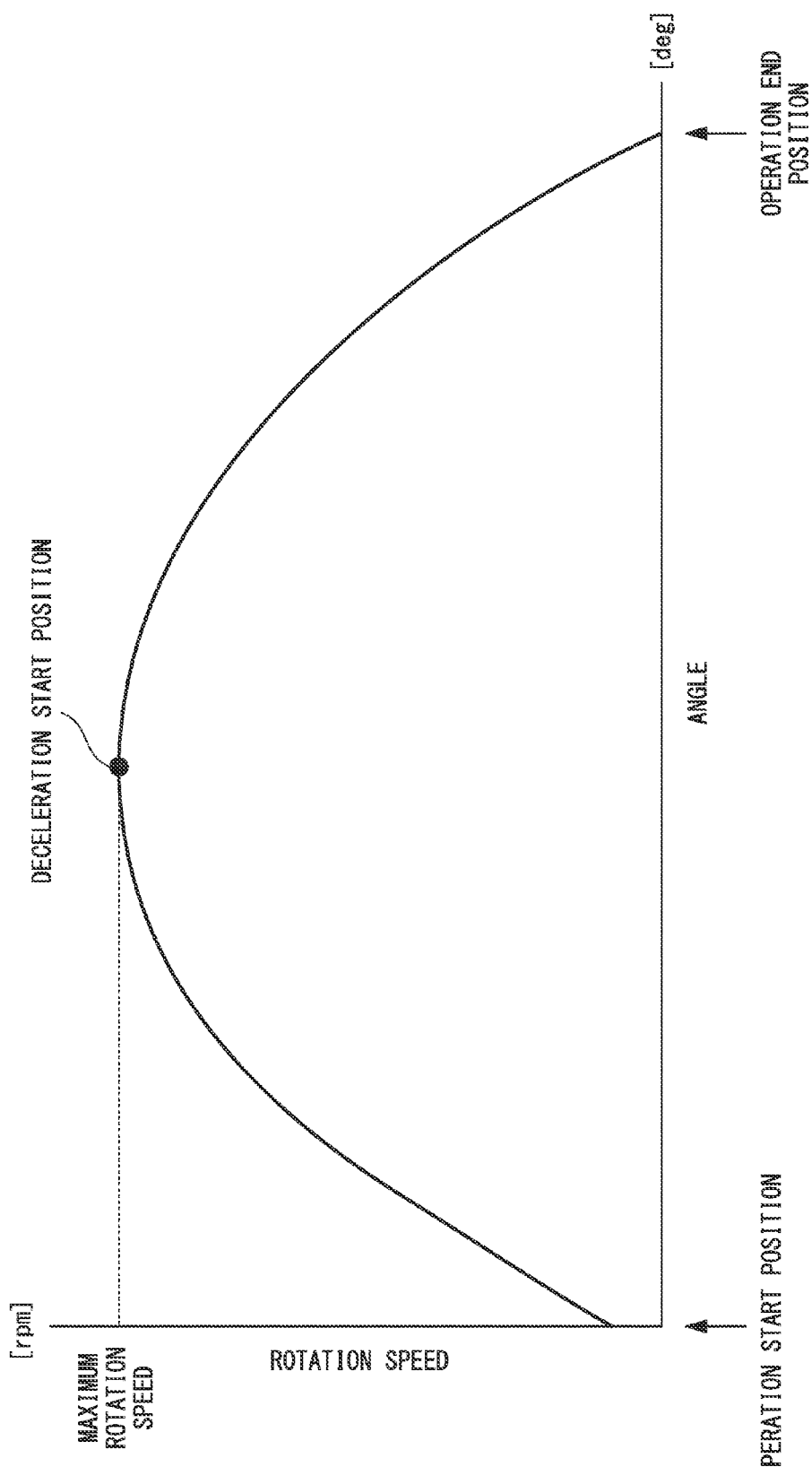
FIG. 3 is an explanatory diagram illustrating an operation of a motor illustrated in FIG. 1.

Next, the operation of the motor 2 will be described with reference to FIG. 3. FIG. 3 is a diagram illustrating variation in the rotation speed of the motor 2 when the wiper arm 1 is operated from the operation start position to the operation end position. When the five control parameters (the maximum rotation speed, the operation start position, the operation end position, the addition amount, and the subtraction amount) are specified according to an input signal pattern, the driving control unit 42 first obtains a deceleration start position through an arithmetic operation from the operation start position and the operation end position. Then, the rotation speed is accelerated so that the rotation speed of the motor 2 is set to the maximum rotation speed at the angle of the deceleration start position.

Subsequently, at a point in time at which the deceleration start position has been reached (a point in time at which the maximum rotation speed has been reached), the rotation speed is decelerated so that the rotation speed is changed to deceleration and the rotation speed at the angle of the operation end position becomes 0. At this time, it is possible to implement the operation of the wiper arm 1 without a sense of incompatibility by smoothly varying the rotation speed as in a curve illustrated in FIG. 3. The operation of the wiper arm 1 replaces the operation start position and the operation end position of the operation illustrated in FIG. 3 and thus the wiper arm 1 can reciprocate to perform the wiping operation.

Figure 4:
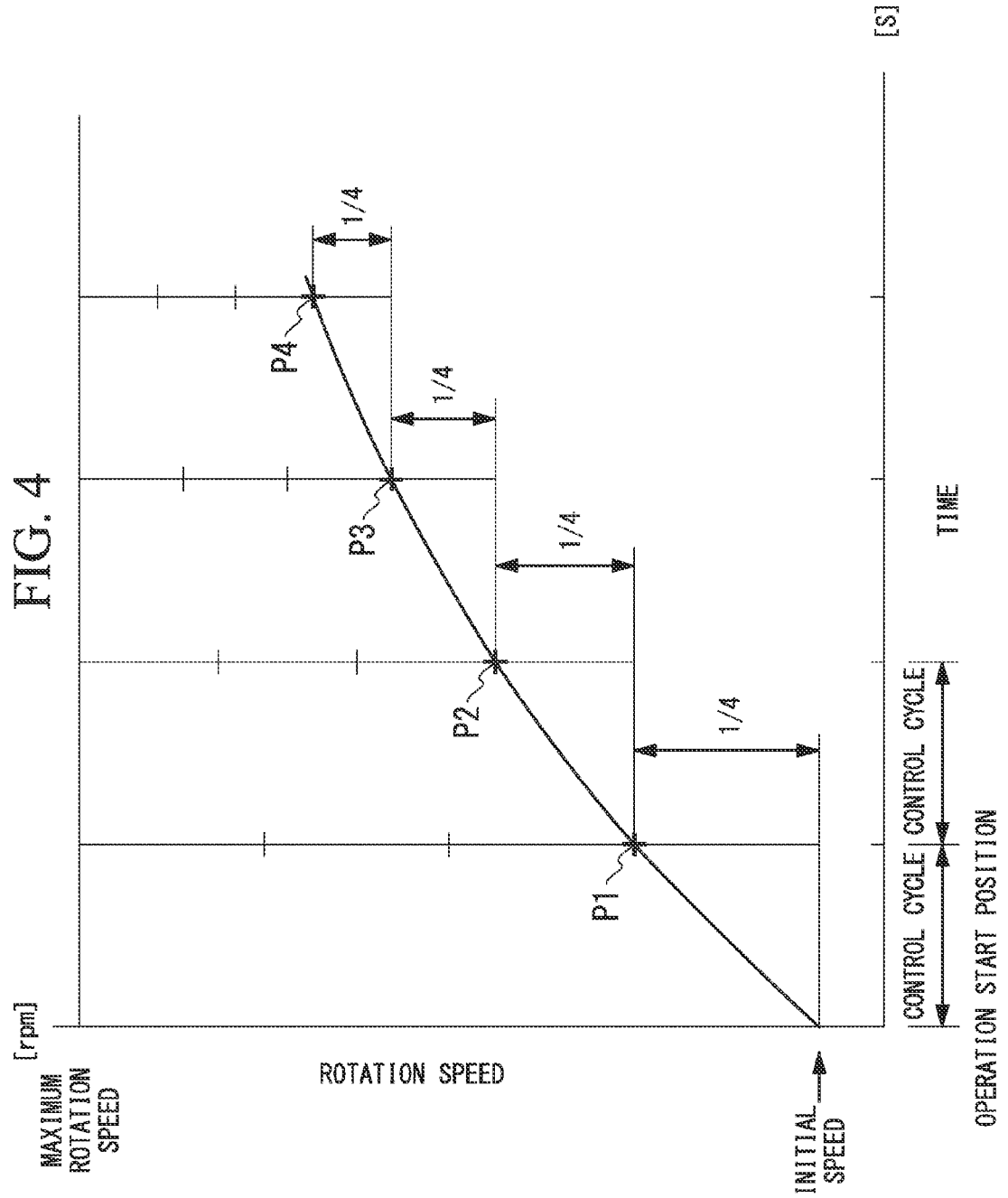
FIG. 4 is an explanatory diagram illustrating an operation of the motor illustrated in FIG. 1.

Next, an operation of accelerating the rotation speed of the motor 2 will be described with reference to FIG. 4. FIG. 4 is a diagram illustrating the operation of accelerating the rotation speed of the motor 2. The driving control unit 42 first outputs a predetermined initial speed value as a command value of a target rotation speed at an operation start position, and starts the rotation of the motor 2. Then, at a point in time at which the control cycle has been reached, a value (Initial speed+(Maximum rotation speed−Initial speed)×1/X1) obtained by adding a value ((Maximum rotation speed−Initial speed)×1/X1) obtained by multiplying a difference (Maximum rotation speed−Initial speed) between the maximum rotation speed and the rotation speed (here, an initial value) of the current time point by the addition amount (which is a value obtained from the parameter storage unit 43, for example, 1/X1) to the target rotation speed of the current time point serves as a new target rotation speed (a point P1 illustrated in FIG. 4). In the example illustrated in FIG. 4, a value of X1 is 4. Then, at a point in time at which the next control cycle has been reached, a value (a point P2 illustrated in FIG. 4) obtained by adding a value obtained by multiplying a difference between the target rotation speed of the current point (here, the point P1) and the maximum rotation speed by ¼ to the target rotation speed of the current time point is set as a new target rotation speed. By iterating a similar process, the rotation operation of the rotary shaft of the motor 2 is controlled by setting points P3 and P4 as the new target rotation speed.

In addition, the subtraction amount (which is a value obtained from the parameter storage unit 43, for example, 1/(X2−1)) is subtracted from the target rotation speed of the current time point after the deceleration start position has been reached, and the target rotation speed ultimately approaches 0. At a point in time at which the operation end position has been reached, the rotation of the rotary shaft of the motor 2 is stopped.

Figure 5:
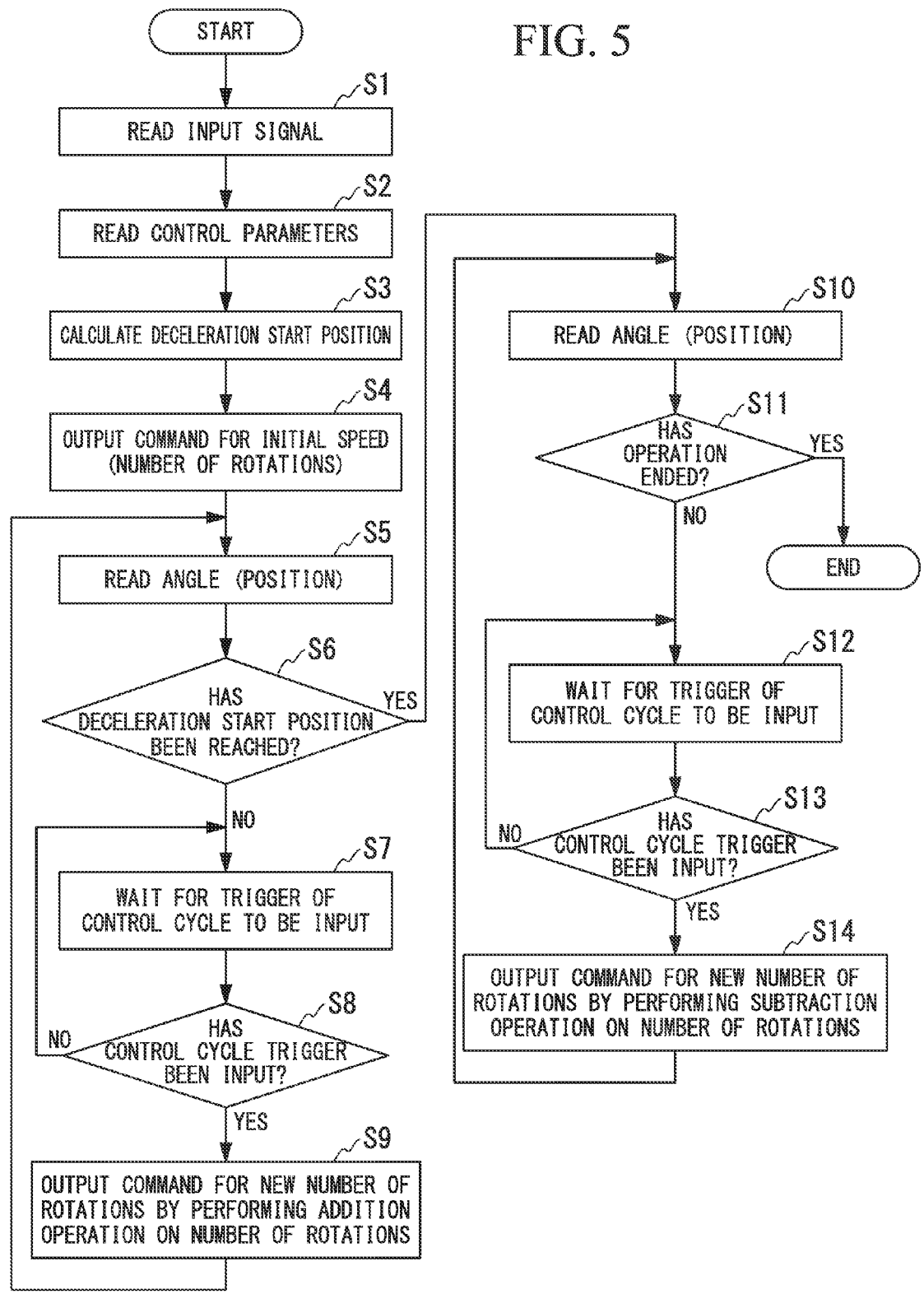
FIG. 5 is a flowchart illustrating an operation of a control section unit illustrated in FIG. 1.

Next, an operation in which the control unit 4 illustrated in FIG. 1 controls the rotation of the motor 2 will be described with reference to FIG. 5. First, the signal input unit 41 reads an input signal, and outputs the read input signal to the driving control unit 42 (step S1). The driving control unit 42 specifies a pattern of the input signal output from the signal input unit 41, and reads control parameters associated with the input signal pattern consistent with the specified input signal pattern from the parameter storage unit 43 (step S2). Here, a maximum rotation speed of "65," an operation start position of "0," an operation end position of "150," an addition amount of "¼" (X1=4), and a subtraction amount of "1/(4−1)" (X2=4) as the control parameters will be described as having been read.

Next, the driving control unit 42 calculates a deceleration start position from the operation start position of "0" and the operation end position of "150" (step S3). The deceleration start position, for example, is set as a middle point ((0+150)/2=75) between the operation start position and the operation end position. Then, the driving control unit 42 outputs a command for setting a predetermined initial value as the target rotation speed to the motor-driving unit 3 (step S4). Thereby, the motor 2 starts rotation.

Next, the driving control unit 42 reads an angle value which is an output of the angle sensor 21 (step S5). The angle value output by the angle sensor 21 corresponds to a value representing a position of the wiper arm 1.

Then, the driving control unit 42 determines whether the read angle value has reached the deceleration start position (step S6). If the determination result indicates that the deceleration start position has not been reached, the driving control unit 42 waits for a trigger of the control cycle to be input while determining whether the trigger of the control cycle has been input (steps S7 and S8).

Then, at a point in time at which the trigger of the control cycle has been input, a new target rotation speed (the number of rotations) is obtained by adding the addition amount to the target rotation speed (the number of rotations) of the current time point, and a command for setting the obtained target rotation speed value as a new target rotation speed is output to the motor-driving unit 3 (step S9).

Until the deceleration start position is reached, the driving control unit 42 iterates processing operations of steps S5 to S9. Thereby, the motor 2 reaches the deceleration start position while the rotation speed increases from the operation start position as illustrated in FIG. 3.

Next, at a point in time at which the deceleration start position has been reached, the driving control unit 42 reads the angle value which is an output of the angle sensor 21 (step S10). Then, the driving control unit 42 determines whether the read angle value has reached the operation end position (step S11). If the determination result indicates that the operation end position has not been reached, the driving control unit 42 waits for a trigger of the control cycle to be input while determining whether the trigger of the control cycle has been input (steps S12 and S13).

Then, at a point in time at which the trigger of the control cycle has been input, a new target rotation speed (the number of rotations) is obtained by subtracting the subtraction amount from the target rotation speed (the number of rotations) of the current time point, and a command for setting the obtained target rotation speed value as a new target rotation speed is output to the motor-driving unit 3 (step S14). Until the operation end position is reached, the driving control unit 42 iterates processing operations of steps S10 to S14. At a point in time at which the operation end position is reached, the rotation of the motor 2 is stopped. Thereby, the motor 2 reaches the operation end position while the rotation speed decreases as illustrated in FIG. 3.

Also, although the parameter storage unit 43 in which five control parameters are associated and stored for each input signal pattern is provided in the control unit 4, the five control parameters are selected according to an input signal, and the rotation of the motor 2 is controlled based on the selected control parameters in the above description, the five control parameters may be input from the outside (a computer which generally controls the operation of the vehicle, or the like) of the control unit 4 and the driving control unit 42 may be configured to control the rotation of the motor 2 based on the five input control parameters. This is possible because the target rotation speed is obtained by an arithmetic operation inside the driving control unit 42.

As described above, because only the five control parameters are stored for each input signal pattern inside the control unit 4 and a target rotation speed (the number of rotations) varying every moment is obtained by an arithmetic operation, it is unnecessary to store a target rotation speed (the number of rotations) at each angle. Thus, there is an advantageous effect in that a microcomputer with a small memory capacity is applicable and an increase in cost of a wiper device can be prevented. In addition, because the parameter storage unit 43 is configured to store only the five control parameters for each input signal pattern, a table in which a relationship between an angle and a target rotation speed is defined does not increase. Thus, it is possible to narrow a wiping range according to an input signal pattern or implement a wiping operation in which the target rotation speed is changed. In addition, it is possible to set a smooth target rotation speed because interpolation is linear interpolation.

In addition, the wiper control process may be implemented by recording a program for implementing the function of the control unit 4 in FIG. 1 on a computer-readable recording medium and causing a computer system to read and execute the program recorded on the recording medium. The "computer system" used herein may include an operating system (OS) and/or hardware such as peripheral devices. In addition, the "computer-readable recording medium" refers to a storage device including a flexible disk, a magneto-optical disc, a read-only memory (ROM), a portable medium such as a compact disc-ROM (CD-ROM), and a hard disk embedded in the computer system. Further, the "computer-readable recording medium" may include a computer-readable recording medium for holding programs for a predetermined time such as a volatile memory (random access memory (RAM)) inside a computer system including a server and a client when a program is transmitted via a network such as the Internet or a communication line such as a telephone line.

In addition, the above-described program may be transmitted from a computer system storing the program in a storage device or the like to other computer systems via a transmission medium or transmission waves of the transmission medium. Here, the "transmission medium" for transmitting the program refers to a medium having a function of transmitting information like a network (communication network) such as the Internet or a communication line (communication wire) such as a telephone line. The above-described program may be used to implement some of the above-described functions. Further, the program may be a so-called differential file (differential program) capable of implementing the above-described functions in combination with a program already recorded on the computer system.

Second Embodiment

Figure 7:
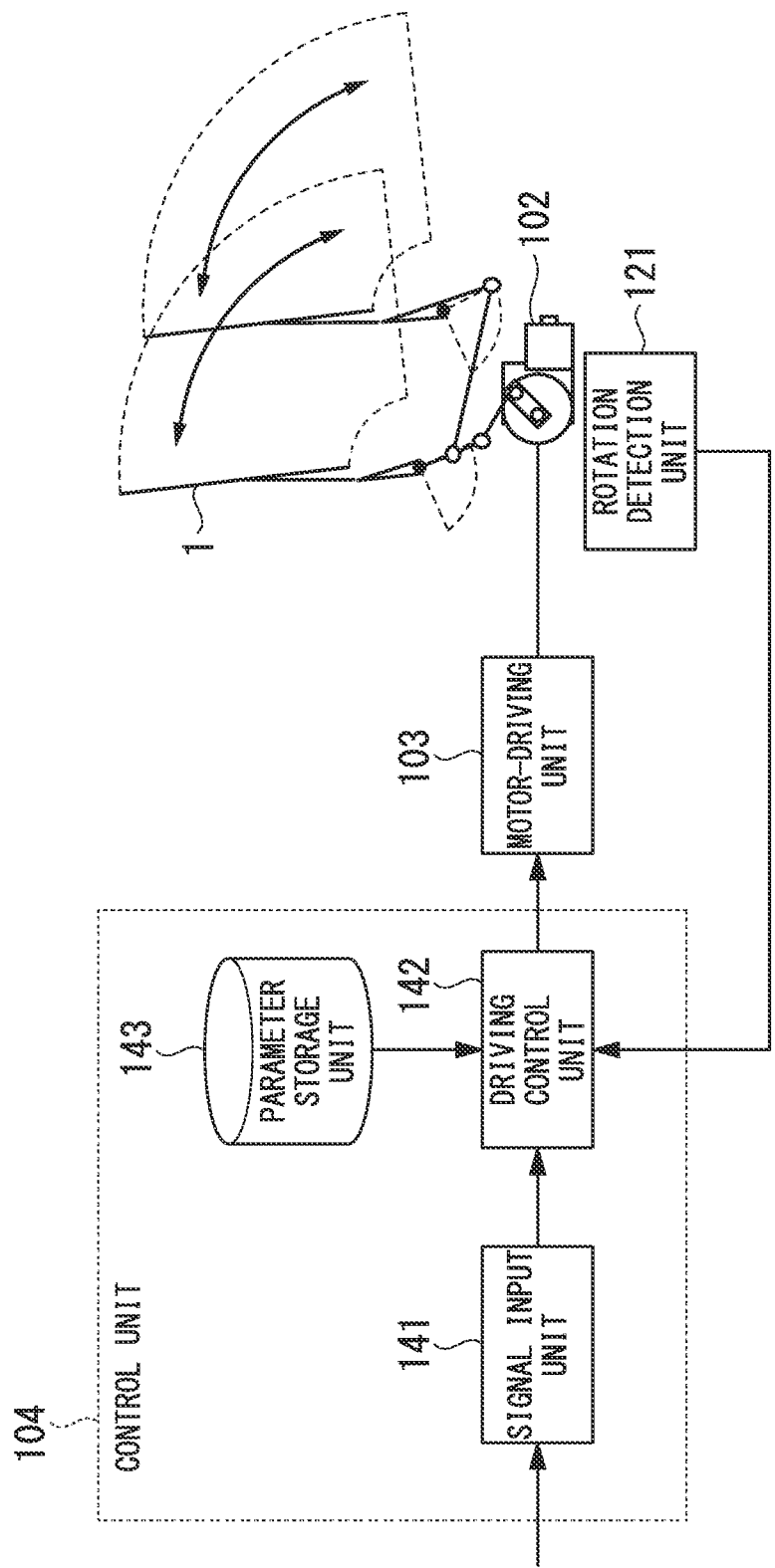
FIG. 7 is a block diagram illustrating a configuration of a second embodiment of the present invention.

Hereinafter, a motor control device according to the second embodiment of the present invention will be described with reference to the drawings. FIG. 7 is a block diagram illustrating a configuration of the same present embodiment. Here, an example of a wiper device included in a vehicle will be described as an object to be controlled according to rotation of a motor controlled by the motor control device. In FIG. 7, reference sign 101 denotes a wiper arm which wipes a windshield. Reference sign 102 denotes a motor for causing the wiper arm 101 to perform a wiping operation. The wiper arm 101 is connected to a rotary shaft of the motor 102 through a link mechanism, and performs the wiping operation by switching a rotational direction of the rotary shaft between forward rotation and reverse rotation and reciprocating the wiper arm 101.

Reference sign 121 denotes a rotation detection unit which outputs a signal for detecting the rotational angle of the rotary shaft of the motor. The rotation detection unit 121 outputs a pulse according to the rotation of the rotary shaft with a sensor which detects an origin of one point. The sensor which detects the origin outputs a signal representing that the origin has been detected at a point in time at which the origin has been detected. In addition, the pulse representing the rotation is output according to a predetermined rotational angle. For example, when the pulse is configured to be output at every angle of 1 degree, it is possible to obtain the rotational angle by counting the number of output pulses. It is possible to obtain an absolute rotational angle by counting the number of pulses after the origin has been detected.

Here, for simplicity of description, the rotational angle of the rotary shaft of the motor 102 and the operation angle of the wiper arm 101 will be described as being consistent with each other. That is, it is assumed that the rotary shaft of the motor 102 reciprocates at the rotational angle between 0 degrees and 150 degrees if the operation angle of the wiper arm 101 is 0 degrees to 150 degrees. Reference sign 103 denotes a motor-driving unit which drives the motor 102 by controlling power to be supplied according to a driving command.

Reference sign 104 denotes a control unit which outputs a driving command to the motor-driving unit 103 in order to control the rotation of the motor 102, and includes a microcomputer. Reference sign 141 denotes a signal input unit which inputs a signal which is transmitted and received within a vehicle via an in-vehicle LAN, for example, a CAN or an LIN. The signal input by the signal input unit 141 includes a signal representing a state of a wiper switch for issuing an instruction for a wiping operation start/stop to the wiper device or a signal representing a speed (a low speed, a high speed, intermittence, or the like) of the wiping operation. In addition, a signal representing a speed of the vehicle or a signal representing an open/close state of a bonnet is also input to the signal input unit 141.

Reference sign 142 denotes a driving control unit which controls the wiping operation of the wiper arm 101 by controlling the rotation operation of the motor 102 based on a signal input in the signal input unit 141 and a signal for detecting a rotational angle of the motor output by the rotation detection unit 121. Reference sign 143 denotes a parameter storage unit which associates and stores a pattern of the input signal input in the signal input unit 141 and parameters for controlling the motor 102 in advance.

Next, a table structure of the parameter storage unit 143 illustrated in FIG. 7 will be described with reference to FIG. 8.

FIG. 8 is a diagram illustrating the table structure of the parameter storage unit 143 illustrated in FIG. 7. In the parameter storage unit 143, control parameters are associated and stored for each input signal pattern.

When signals of three systems are input to the signal input unit 141, the input signal pattern is made by classifying the signals of the three systems. When the signal to be input is a wiper switch signal, a bonnet open/close signal, or a vehicle speed signal, classification is performed for each signal value. For example, a first input signal pattern is when a wiper switch is set to "Lo" representing a low-speed wiping operation, a bonnet open/close signal is "close," and a vehicle speed signal is less than or equal to 60 km/h. In this classification, all the cases in which it is necessary to control an operation of the wiper device according to a signal input to the signal input unit 141 are associated and stored in advance.

The control parameters include five parameters such as a "maximum rotation speed", an "operation start position", an "operation end position", an "addition amount", and a "subtraction amount". The "maximum rotation speed" is a maximum value of the rotation speed of the motor 102 when the wiper arm 101 operates from a current position or a predetermined position to a target position. Here, the rotation speed is represented by the number of rotations [rpm]. The "operation start position" is a position of the wiper arm 101 at a point in time at which a predetermined operation is started. Here, it is assumed that the position of the wiper arm 101 is represented by an angle, a storage position of the wiper arm 101 is 0 degrees, and a return position of the wiper arm 101 is 150 degrees in a maximum wiping range.

The "operation end position" is a position of the wiper arm 101 when a predetermined operation is ended. For example, when the wiper arm is caused to perform a wiping operation in a maximum wiping range, the "operation start position" is 0 degrees and the "operation end position" is 150 degrees. The "addition amount" is a value for adding a rotation speed amount for each control cycle when the wiper arm 101 is accelerated up to the maximum rotation speed. The "subtraction amount" is a value for subtracting a rotation speed amount for each control cycle when the wiper arm 101 is decelerated from the maximum rotation speed.

Figure 9:
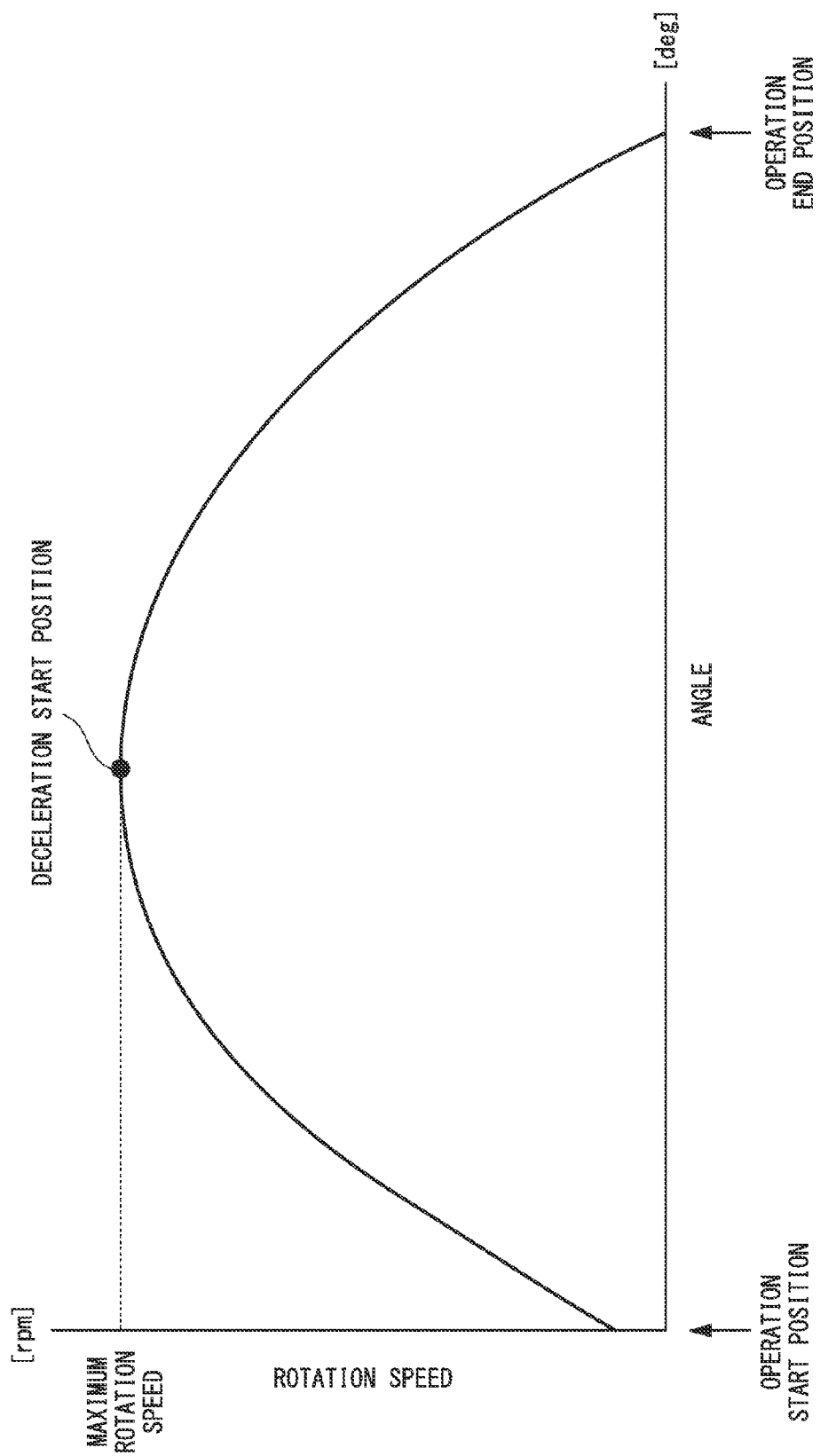
FIG. 9 is an explanatory diagram illustrating an operation of a motor illustrated in FIG. 7.

Next, the operation of the motor 102 will be described with reference to FIG. 9. FIG. 9 is a diagram illustrating variation in the rotation speed of the motor 102 when the wiper arm 101 is operated from the operation start position to the operation end position. When the five control parameters (a maximum rotation speed, an operation start position, an operation end position, an addition amount, and a subtraction amount) are specified according to an input signal pattern, the driving control unit 142 first obtains a deceleration start position through an arithmetic operation from the operation start position and the operation end position. Then, the rotation speed is accelerated so that the rotation speed of the motor 102 is set to the maximum rotation speed at the angle of the deceleration start position.

Subsequently, at a point in time at which the deceleration start position has been reached (a point in time at which the maximum rotation speed has been reached), the rotation speed is decelerated so that the rotation speed is changed to deceleration and the rotation speed at the angle of the operation end position becomes 0. At this time, it is possible to implement the operation of the wiper arm 101 without a sense of incompatibility by smoothly varying the rotation speed as in a curve illustrated in FIG. 9. The operation of the wiper arm 101 replaces the operation start position and the operation end position of the operation illustrated in FIG. 9, so that the wiper arm 101 can reciprocate to perform the wiping operation.

Figure 10:
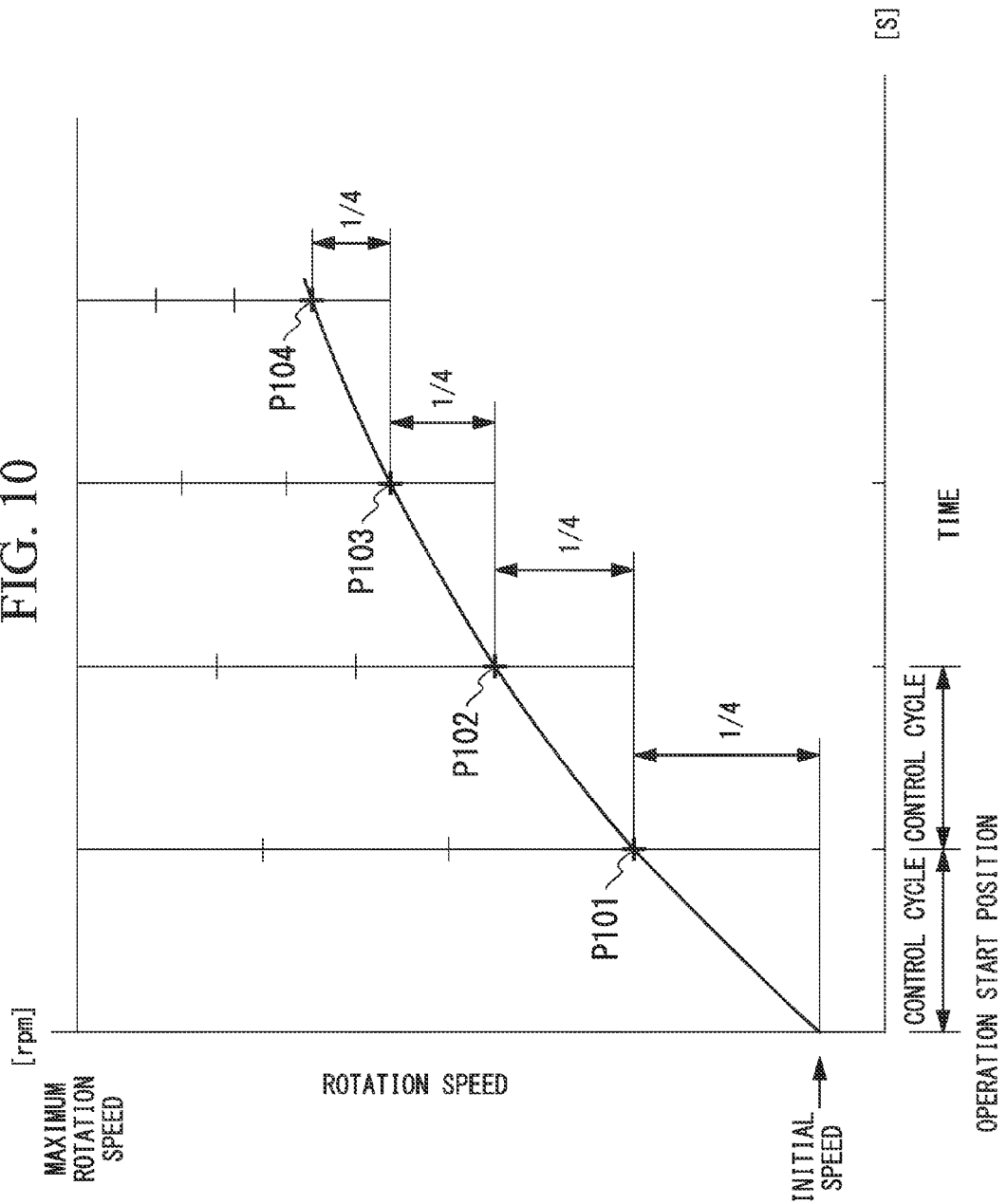
FIG. 10 is an explanatory diagram illustrating an operation of the motor illustrated in FIG. 7.

Next, an operation of accelerating the rotation speed of the motor 102 will be described with reference to FIG. 10. FIG. 10 is a diagram illustrating the operation of accelerating the rotation speed of the motor 102. The driving control unit 142 first outputs a predetermined initial speed value as a command value of a target rotation speed at an operation start position, and starts the rotation of the motor 102. Then, at a point in time at which the control cycle has been reached, a value (Initial speed+(Maximum rotation speed−Initial speed)×1/X1) obtained by adding a value ((Maximum rotation speed−Initial speed)×1/X1) obtained by multiplying a difference (Maximum rotation speed−Initial speed) between the maximum rotation speed and the rotation speed (here, an initial value) of the current time point by the addition amount (which is a value obtained from the parameter storage unit 143, for example, 1/X1) to the target rotation speed of the current time point serves as a new target rotation speed (a point P101 illustrated in FIG. 10). In the example illustrated in FIG. 10, a value of X1 is 4. Then, at a point in time at which the next control cycle has been reached, a value (a point P102 illustrated in FIG. 10) obtained by adding a value obtained by multiplying a difference between the target rotation speed of the current point (here, the point P101) and the maximum rotation speed by /1;4 to the target rotation speed of the current time point is set as a new target rotation speed. By iterating a similar process, the rotation operation of the rotary shaft of the motor 102 is controlled by setting points P103 and P104 as the new target rotation speed.

In addition, the subtraction amount (which is a value obtained from the parameter storage unit 143, for example, 1/(X2−1)) is subtracted from the target rotation speed of the current time point after the deceleration start position has been reached, and the target rotation speed ultimately approaches 0. At a point in time at which the operation end position has been reached, the rotation of the rotary shaft of the motor 102 is stopped.

Figure 11:
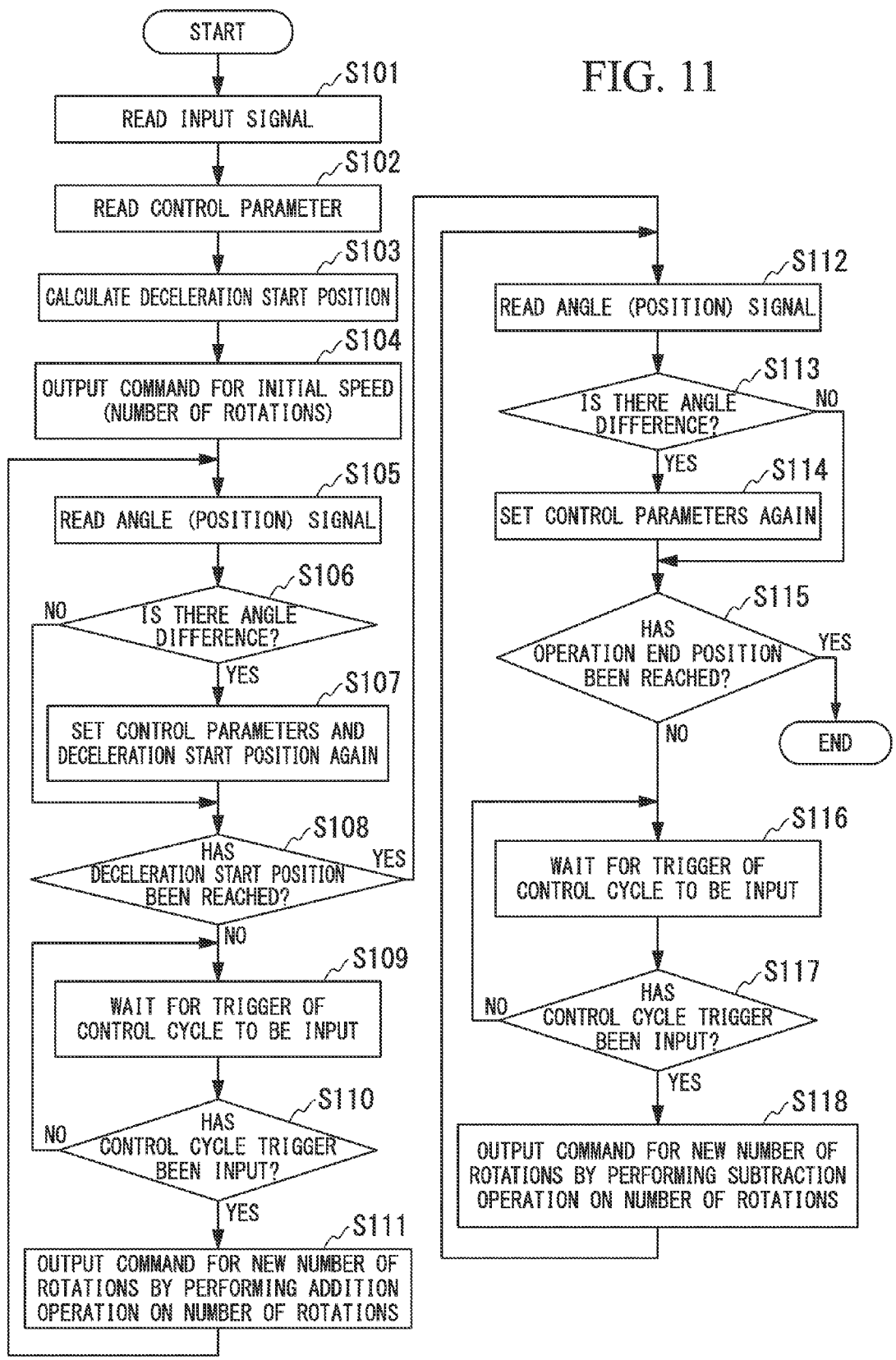
FIG. 11 is a flowchart illustrating an operation of a control section unit illustrated in FIG. 7.

Next, an operation in which the control unit 104 illustrated in FIG. 7 controls the rotation of the motor 102 will be described with reference to FIG. 11. First, the signal input unit 141 reads an input signal, and outputs the read input signal to the driving control unit 142 (step S101). The driving control unit 142 specifies a pattern of the input signal output from the signal input unit 141, and reads control parameters associated with the input signal pattern consistent with the specified input signal pattern from the parameter storage unit 143 (step S102). Here, a maximum rotation speed of "65," an operation start position of "0," an operation end position of "150," an addition amount of "¼" (X1=4), and a subtraction amount of "1/(4−1)" (X2=4) will be described as having been read as the control parameters.

Next, the driving control unit 142 calculates a deceleration start position from the operation start position of "0" and the operation end position of "150" (step S103). The deceleration start position, for example, is set as a middle point ((0+150)/2=75) between the operation start position and the operation end position. Then, the driving control unit 142 outputs a command for setting a predetermined initial value as the target rotation speed to the motor-driving unit 103 (step S104). Thereby, the motor 102 starts rotation.

Next, the driving control unit 142 reads a signal output from the rotation detection unit 121, counts a pulse of the read signal, and specifies the rotational angle (step S105). Here, the specified rotational angle corresponds to a value representing the position of the wiper arm 101. In addition, when a signal representing that the origin has been detected has been output from the rotation detection unit 121, the driving control unit 142 determines whether a difference between the rotational angle specified by counting the output pulse at the current time point and the origin is large (step S106).

Figure 12A:
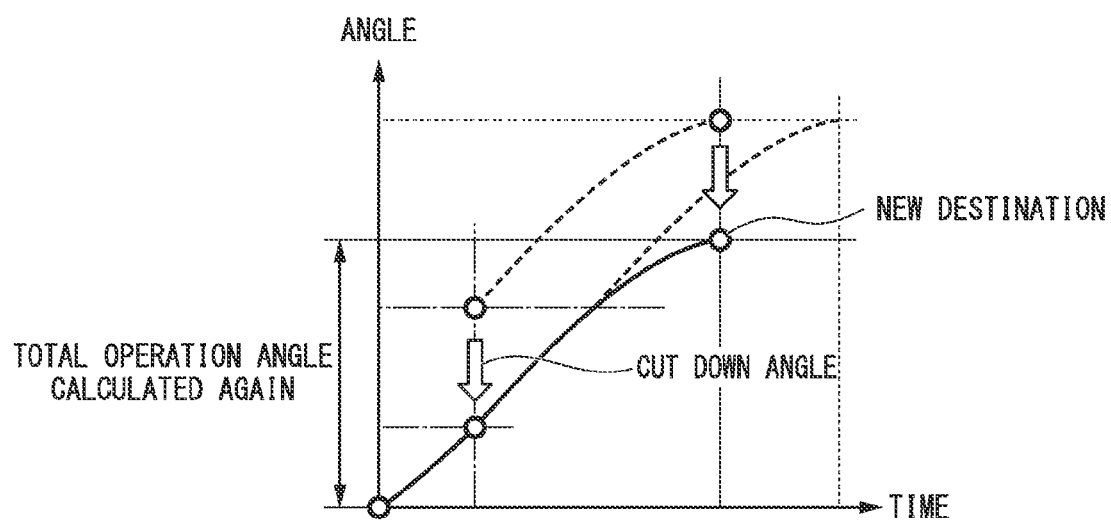
FIG. 12A is an explanatory diagram illustrating a rotation operation of the motor.
Figure 12B:
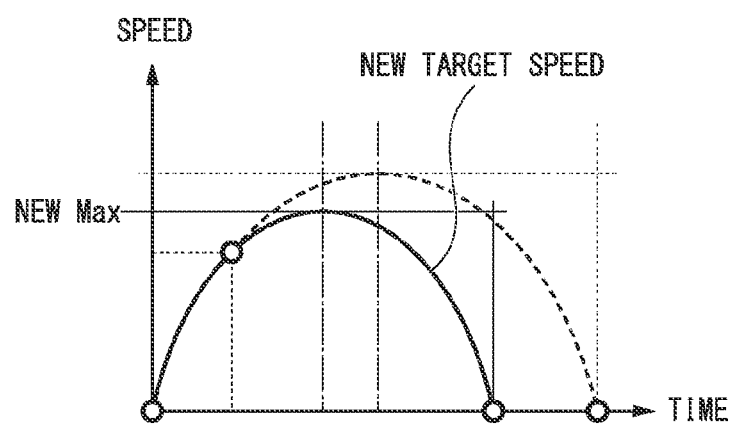
FIG. 12B is an explanatory diagram illustrating a rotation operation of the motor.

When the determination result indicates that the difference between the rotational angle specified at the current time point and the origin position is large, the driving control unit 142 resets the rotational angle of the current time point to the origin position and again sets the control parameters and the deceleration start position (step S107). That is, the operation end position, the maximum rotation speed, and the deceleration start position are newly calculated and set (see FIGS. 12A and 12B). On the other hand, when the difference between the rotational angle specified at the current time point and the origin position is small (to the extent that rapid speed variation does not occur) or when there is no difference, the control parameters and the deceleration start position are not set again.

Next, the driving control unit 142 determines whether the specified angle value has reached the deceleration start position (step S108). When the determination result indicates that the deceleration start position has not been reached, the driving control unit 142 waits for the trigger of the control cycle to be input while determining whether the trigger of the control cycle has been input (steps S109 and S110).

Then, at a point in time at which the trigger of the control cycle has been input, a new target rotation speed (the number of rotations) is obtained by adding the addition amount to the target rotation speed (the number of rotations) of the current time point, and a command for setting the obtained target rotation speed value as a new target rotation speed is output to the motor-driving unit 103 (step S111). Until the deceleration end position is reached, the driving control unit 142 iterates processing operations of steps S105 to S111. Thereby, the motor 2 reaches the deceleration start position while the rotation speed increases from the operation start position as illustrated in FIG. 9.

Next, at a point in time at which the deceleration start position has been reached, the driving control unit 142 reads a signal output from the rotation detection unit 211, counts a pulse of the read signal, and specifies a rotational angle (step S112). In addition, when a signal representing that the origin has been detected from the rotation detection unit 121 has been output, the driving control unit 142 determines whether a difference between the rotational angle specified by counting the output pulse at a current time point and the origin is large (step S113).

When the determination result indicates that the difference between the rotational angle specified at the current time point and the origin position is large, the driving control unit 142 resets the rotational angle of the current time point to the origin position, and again sets the control parameters (step S114). That is, the operation end position and the maximum rotation speed are newly calculated and set. On the other hand, when the difference between the rotational angle specified at the current time point and the origin position is small (to the extent that rapid speed variation does not occur) or when there is no difference, the control parameters are not set again.

Next, the driving control unit 142 specifies whether the specified angle value has reached the operation end position (step S115). If the determination result indicates that the operation end position has not been reached, the driving control unit 42 waits for a trigger of the control cycle to be input while determining whether the trigger of the control cycle has been input (steps S116 and S117).

Then, at a point in time at which the trigger of the control cycle has been input, a new target rotation speed (the number of rotations) is obtained by subtracting the subtraction amount from the target rotation speed (the number of rotations) of the current time point, and a command for setting the obtained target rotation speed value as a new target rotation speed is output to the motor-driving unit 103 (step S118).

Until the operation end position is reached, the driving control unit 142 iterates processing operations of steps S112 to S118. At a point in time at which the operation end position is reached, the rotation of the motor 102 is stopped. Thereby, the motor 102 reaches the operation end position while the rotation speed decreases as illustrated in FIG. 9.

Also, although the parameter storage unit 143 in which five control parameters are associated and stored for each input signal pattern is provided in the control unit 104, the five control parameters are selected according to an input signal, and the rotation of the motor 102 is controlled based on the selected control parameters in the above description, the five control parameters may be input from the outside (a computer which generally controls the operation of the vehicle, or the like) of the control unit 104 and the driving control unit 142 may be configured to control the rotation of the motor 102 based on the five input control parameters. This is possible because the target rotation speed is obtained by an arithmetic operation inside the driving control unit 142.

In addition, although an example in which the control parameters and the deceleration start position are set again when a difference between the rotational angle specified by a pulse count and the origin is large has been described above, the present invention is also applicable when a request of an operation input to the control unit 104 has been varied during the wiping operation or the like. For example, when a request for changing the maximum rotation speed has been input during a predetermined wiping operation, it is possible to continue the wiping operation without a sense of incompatibility because it is possible to prevent rapid speed variation from occurring by setting the control parameters and the deceleration start position again. In highly-functional wiper devices of recent years, a function of changing control parameters when a vehicle speed is rapidly varied during a basic wiping operation is provided. It is possible to prevent an operation with a sense of incompatibility from occurring in an operation of the wiper arm by applying the present invention to such wiper devices.

As described above, because only the five control parameters are stored for each input signal pattern inside the control unit 104 and a target rotation speed (the number of rotations) varying every moment is obtained by an arithmetic operation, it is unnecessary to store a target rotation speed (the number of rotations) at each angle. Thus, there is an advantageous effect in that a microcomputer with a small memory capacity is applicable and an increase in cost of a wiper device can be prevented.

In addition, when the origin is detected and a difference between the rotational angle specified at the current time point and the detected origin is large, the control parameters and the deceleration start position are calculated again, and the control parameters and the deceleration start position are configured to be set again based on the calculation results. Thus, it is possible to prevent rapid speed variation from occurring and implement a smooth wiping operation.

In addition, because the parameter storage unit 143 is configured to store only the five control parameters for each input signal pattern, a table in which a relationship between an angle and a target rotation speed is defined does not increase. Thus, it is possible to narrow a wiping range according to an input signal pattern or implement a wiping operation in which the target rotation speed is changed. In addition, it is possible to set a smooth target rotation speed because interpolation is linear interpolation.

The wiper control process may be implemented by recording a program for implementing the function of the control unit 104 in FIG. 7 on a computer-readable recording medium and causing a computer system to read and execute the program recorded on the recording medium. The "computer system" used herein may include an OS and/or hardware such as peripheral devices. In addition, the "computer-readable recording medium" refers to a storage device including a flexible disk, a magneto-optical disc, a ROM, a portable medium such as a CD-ROM, and a hard disk embedded in the computer system. Further, the "computer-readable recording medium" may include a computer-readable recording medium for holding programs for a predetermined time such as a volatile memory (RAM) inside a computer system including a server and a client when a program is transmitted via a network such as the Internet or a communication line such as a telephone line.

In addition, the above-described program may be transmitted from a computer system storing the program in a storage device or the like to other computer systems via a transmission medium or transmission waves of the transmission medium. Here, the term "transmission medium" for transmitting the program refers to a medium having a function of transmitting information like a network (communication network) such as the Internet or a communication line (communication wire) such as a telephone line. The above-described program may be used to implement some of the above-described functions. Further, the program may be a so-called differential file (differential program) capable of implementing the above-described functions in combination with a program already recorded on the computer system.

INDUSTRIAL APPLICABILITY

The present invention can be applied to the purpose of indispensably controlling an operation of an object to be controlled via a link mechanism connected to a rotary shaft of a motor and, for example, can also be applied to control an operation of an electric tailgate, a slide door, a power window, etc. provided in a vehicle.

REFERENCE SIGNS LIST

1 Wiper arm
2 Motor
21 Angle sensor
3 Motor-driving unit
4 Control unit
41 Signal input unit
42 Driving control unit
43 Parameter storage unit

The invention claimed is:

1. A motor control device which controls rotation of a motor to which a controlled object is connected, the motor control device comprising:
   a parameter input device configured to input parameters necessary for controlling the motor including information about operation start and end positions in a reciprocating motion of the object to be controlled, information about a maximum rotation speed of the motor, addition amount information of a rotation speed, and subtraction amount information of the rotation speed;
   a position detection device configured to detect a position of the object to be controlled; and
   a driving control device, which, when the object to be controlled is operated from the operation start position to the operation end position, is configured to calculate one deceleration start position from the information about the operation start and end positions, to perform a gradual addition operation on a target rotation speed based on a difference between a maximum rotation speed and the rotation speed at a current time point and the addition amount information, to drive the motor while accelerating the motor so that the motor rotates at the target rotation speed until the position detection device detects that the object to be controlled has reached the deceleration start position, to perform a gradual subtraction operation on the target rotation speed based on the difference between the maximum rotation speed and the rotation speed at the current time point and the subtraction amount information at a point in time at which it is detected that the object to be controlled has reached the deceleration start position, to perform a gradual subtraction operation on the target rotation speed based on the difference between the maximum rotation speed and the rotation speed at the current time point and the subtraction amount information at a point in time at which it is detected that the object to be controlled has reached the deceleration start position, and to drive the motor while decelerating the motor so that the motor rotates at the target rotation speed until the position detection device detects that the object to be controlled has reached the operation end position.

2. A motor control device which controls rotation of a motor to which a controlled object is connected, the motor control device comprising:
   a signal input device configured to input a signal from an outside;
   a parameter storage device in which parameters necessary for controlling the motor including an input signal pattern input by the signal input device, information about operation start and end positions of the object to be controlled, information about a maximum rotation speed of the motor, addition amount information of a rotation speed, and subtraction amount information of the rotation speed are associated and stored in advance;
   a position detection device configured to detect a position of the object to be controlled; and
   a driving control device, which, when the object to be controlled is operated from the operation start position to the operation end position, is configured to read the parameters necessary for controlling the motor associated with the input signal pattern input by the signal input device from the parameter storage device, to calculate a deceleration start position from the information about the operation start and end positions, to perform a gradual addition operation on a target rotation speed based on a difference between a maximum rotation speed and the rotation speed at a current time point and the addition amount information, to drive the motor while accelerating the motor so that the motor rotates at the target rotation speed until the position detection device detects that the object to be controlled has reached the deceleration start position, to perform a gradual subtraction operation on the target rotation speed based on the difference between the maximum rotation speed and the rotation speed at the current time point and the subtraction amount information at a point in time at which it is detected that the object to be controlled has reached the deceleration start position, and to drive the motor while decelerating the motor so that the motor rotates at the target rotation speed until the position detection device detects that the object to be controlled has reached the operation end position.

3. The motor control device according to claim 1 or 2, wherein the controlled object is a wiper device provided in a vehicle.

* * * * *